Nov. 8, 1927.

R. J. MILLER

ELECTROMAGNETIC ELEMENT

Original Filed Oct. 17. 1924

1,648,460

INVENTOR
Roy J. Miller
by William B. Wharton
his attorney

Patented Nov. 8, 1927.

1,648,460

UNITED STATES PATENT OFFICE.

ROY J. MILLER, OF CRAFTON, PENNSYLVANIA.

ELECTROMAGNETIC ELEMENT.

Application filed October 17, 1924, Serial No. 744,221. Renewed August 13, 1926.

This invention relates to an electro-magnetic element for use in various connections, and particularly adapted for use in a recording voltmeter.

Previously, recording voltmeters of the type comprising a revoluble calibrated chart have had the resistance units of the meter mounted on the back thereof. This arrangement has been due partly to the size of the resistance units employed, and partly because it has been considered that the heat of the resistance units would interfere with the accurate operation of the clock of the meter. A disadvantage of this arrangement, however, has been that it rendered the meter unsightly and cumbersome, and placed the resistance units in a position where they have been subjected to injury.

One object of the invention is to provide means which permit the accurate regulation of the instrument by directly acting upon the elements of the meter which actuate the recording pen thereof.

A further object is to provide means which not only provide for an initial regulation of the instrument, but which also may be utilized from time to time to compensate for deviations in the mounting of the meter from an absolutely level position, to compensate for fatigue in the balancing spring of the meter, and to compensate for distortion of the recording pen itself.

By these means the operation of a number of meters may be easily standardized. The necessity for frequent repairs to the meters is avoided because the meters may be rendered accurate without the immediate replacement of parts which have become worn or injured. By these means the necessity for accurately levelling the meter in field work is also rendered unnecessary.

Figure 1:
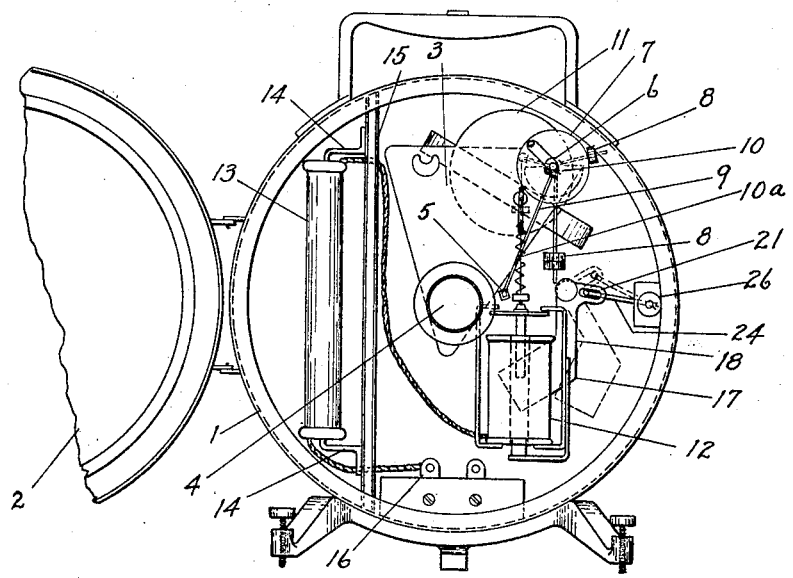
Figure 3:
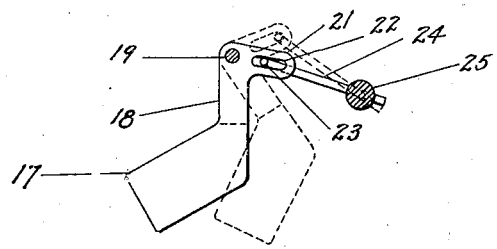
Figure 2:
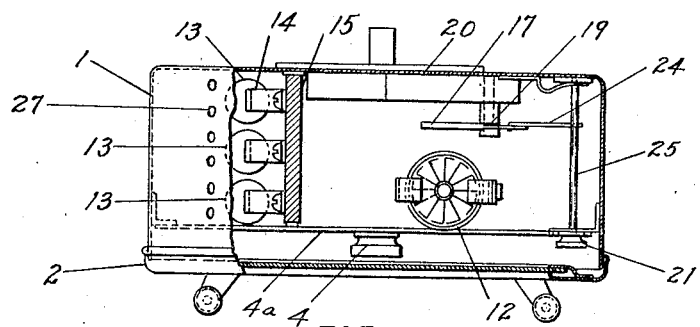

In the accompanying drawings Figure 1 is a front elevation of the voltmeter with the front cover of the meter swung to one side; Figure 2 is a horizontal sectional view omitting most of the operating mechanism of the meter which is not the subject matter of the present invention; and Figure 3 is an elevation showing in detail the magnetic member which is the subject matter of the present invention.

The meter is in most respects of a standard type, and comprises a casing 1 of disk form provided with a hinged front cover 2. The operating mechanism of the meter comprises a clock 3 for rotating a shaft 4, which carries a disk $4^a$ and the calibrated chart of the instrument. The recording pen 5 of the meter is pivotally mounted at 6 on a rotatable member 7, provided with balancing arms 8, in such manner that its mounting rod 9 may pass through an opening in the disk $4^a$ and the pen lie in contact with the calibrated chart thereon. The pen is operated in accordance with fluctuations in voltage by means of a flexible connection 10 operatively connecting one of the arms 8 of the rotatable pen carrying member 7 with a magnetic plunger 11 inductively related to the field coil or solenoid 12. A coiled balancing spring $10^a$, surrounding the connection 10, resists movement of the plunger 11 and pen 5 and serves to compensate for the inherent incapacity of the solenoid to function uniformly under relatively light and heavy currents.

The structure mentioned above has been outlined briefly because it is old and well known in the art, and comprises none of the novel features of the present invention.

Within the casing are a plurality of resistance units 13, (3 being shown) which are secured by means of brackets 14 to a partition 15 which serves not only to support the units but also to separate them from the operating mechanism within the casing 1. One wire of the circuit is connected to the units and enters the casing by way of binding post 16, and another wire 16 connects the resistance units with solenoid 12. This partition is preferably formed of a heat insulating material; such as fibre or an asbestos composition, or may be a board or the like covered with asbestos. The clock of the instrument is thus protected from any overheating produced by the heating effect of the resistance coils, and such heat as is transmitted is sufficient merely to maintain a substantially uniform temperature within the instrument under variations in atmospheric temperature.

As shown in Figure 2, the portion of the casing which contains the resistance units is provided with a plurality of vents 27, which ventilate this chamber of the meter and prevent an excessively high temperature therein. The partition 15 is preferably made to fit the cover 2 closely so that dust or the like entering by way of vents 27 cannot reach the operating mechanism of the meter in the other chamber of the casing.

It will be observed that the recording pen 5 of the meter is actuated by means of connections with the magnetic plunger 11, which moves in accordance with variations in the field surrounding the solenoid 12. It is therefore possible to regulate movement of the pen 5 by regulating this field and the consequent extent of the movement of plunger 11 in accordance with any set fluctuation in voltage. In order, therefore, to compensate for possible inaccuracies in the record made by the pen 5, such as may be due to a variety of causes, the device of the present invention provides compensating means operating directly to vary the field surrounding the solenoid.

Such means comprise the magnetic vane 17, which is movably mounted in the field of the solenoid 12. From the body of vane 17 extends an arm 18, preferably formed integral with the body of the vane and pivotally mounted on a post 19 supported by a block 20 in the interior of the casing of the meter. Arm 18 is of a general bell crank form, and the outer leg 21 thereof is provided with a slot 22 receiving the pin 23 on link 24. Link 24 in turn may be swung by means of a rigid connection with a shaft 25 provided with an operating knob 26.

When the instrument has been adjusted to as great accuracy as possible with respect to the voltage range which it is to cover and the calibration of the chart which it is to carry, a final and nice regulation may be attained by means of the adjustment of the magnetic vane 17.

If in field work there is any deviation from a true record due to improper levelling of the meter and consequent inaccuracy in the movement of the recording pen; such inaccuracy may be remedied by changing the position of the vane to change the intensity of the field surrounding the solenoid, and the consequent movement of the plunger and recording pen.

If also the record made be inaccurate because of weakening of the spring $10^a$ of the meter or because of variation of the rod of the pen itself from a true line, any inaccuracy due to such causes also may be remedied by changing the position of the magnetic vane. It will be noted that such regulation may be easily and rapidly attained by simply passing currents of known voltage through the instrument and adjusting the position of the magnetic vane until it can be seen that an accurate record is being produced.

The operation of the magnetic vane described above is to be distinguished clearly from the operation of magnetic members which are arranged to be set during the calibration of an instrument for the purpose of simplifying the chart or rendering the readings of the instrument initially accurate. This vane, on the contrary is so designed and so mounted that it serves as a micrometer adjustment in a recording field instrument by means of which the slight inaccuracies which will almost inevitably occur each time the instrument is set up may be readily corrected.

What I claim is:

1. In an electro-magnetic element, the combination of a solenoid comprising a coil, with a field distorting vane of magnetic material mounted for adjustment exteriorly of said coil and arranged to be brought into the field of the coil to a greater or lesser extent to produce a greater or lesser distortion of the field, and manually operable means extending a substantial distance from said vane for effecting an adjustment thereof.

2. In an electro-magnetic element, the combination of a solenoid comprising a coil, with a field distorting vane comprising a member of magnetic material pivotally mounted adjacent said coil and having a body portion and an angular lever portion extending from the body portion, and operating means connected with one arm of said lever for bringing the vane into the coil field to a greater or lesser extent to produce a greater or lesser distortion of the field.

3. In an electro-magnetic element, the combination of a solenoid comprising a coil, with a field distorting vane of magnetic material pivotally mounted exteriorly of said coil, and an operating rod arranged to move said vane to bring it into the coil field to a greater or lesser extent to produce a greater or lesser distortion of the field.

4. In an electro-magnetic element, the combination of a solenoid comprising a coil, with a vane of magnetic material pivotally mounted exteriorly of the coil, an operating rod, and connections between said operating rod and said vane whereby actuation of the operating rod brings the vane into the coil field to a greater or lesser extent to produce a greater or lesser distortion of the field.

In witness whereof, I hereunto set my hand.

ROY J. MILLER.